(12) United States Patent
Hohteri (10) Patent No.: US 9,881,206 B2
(45) Date of Patent: Jan. 30, 2018

(54) SPORTS MONITORING SYSTEM AND METHOD

(71) Applicant: Sstatzz Oy, Helsinki (FI)

(72) Inventor: Harri Hohteri, Helsinki (FI)

(73) Assignee: SSTATZZ OY, Helsinki (FI)

( * ) Notice: Subject to any disclaimer, the term of this patent is extended or adjusted under 35 U.S.C. 154(b) by 0 days.

(21) Appl. No.: 13/859,710

(22) Filed: Apr. 9, 2013

(65) Prior Publication Data

US 2014/0303759 A1    Oct. 9, 2014

(51) Int. Cl.
*A63B 71/00* (2006.01)
*G06K 9/00* (2006.01)
*G09B 19/00* (2006.01)

(52) U.S. Cl.
CPC ..... *G06K 9/00342* (2013.01); *G09B 19/0038* (2013.01)

(58) Field of Classification Search
CPC .. H04Q 9/00; A63B 24/0021; A63B 2220/80; A63B 2220/803; A63B 2024/0056
See application file for complete search history.

(56) References Cited

U.S. PATENT DOCUMENTS

| | | |
|---|---|---|
| 6,380,933 B1 | 4/2002 | Sharir |
| 6,710,713 B1 | 3/2004 | Russo |
| 6,950,123 B2 | 9/2005 | Martins |
| 7,499,077 B2 | 3/2009 | Li |
| 7,620,466 B2 | 11/2009 | Neale |

(Continued)

FOREIGN PATENT DOCUMENTS

| | | |
|---|---|---|
| EP | 2150057 A2 | 2/2010 |
| EP | 2515548 A1 | 10/2012 |
| WO | 95/08816 A1 | 3/1995 |

OTHER PUBLICATIONS

Anonymous: "GPS tracking Unit—Wikipedia, the free encyclopedia", Apr. 5, 2013, XP055140038, retrieved from the internet: URL:http://en.wikipedia.org/w/index.php?title=GPS_tracking_unit&oldid=54887452 [retrieved on Sep. 15, 2014], 6 pages.

(Continued)

*Primary Examiner* — James S McClellan
*Assistant Examiner* — Kevin Carter
(74) *Attorney, Agent, or Firm* — Ziegler IP Law Group, LLC (57) ABSTRACT

A sport monitoring system includes a projectile(s), sensor units for one or more players to wear, and a data processing arrangement. The projectiles are useable in a game played by players. Each projectile has a motion sensing arrangement for generating one or more motion-indicative signals, and a data recording arrangement for recording the motion-indicative signals as a function of time. Each sensor unit is provided with a motion sensing arrangement for generating a motion-indicative signal(s), and a data recording arrangement for recording the motion-indicative signals as a function of time. The data processing arrangement receives data pertaining to the motion-indicative signals from at least one of the projectiles and/or at least one of the sensor units. The data processing arrangement performs a temporal correlation of the data to determine one or more periods of time when the projectiles are likely to be spatially closely associated with the players.

15 Claims, 6 Drawing Sheets

(56) References Cited

U.S. PATENT DOCUMENTS

| | | |
|---|---|---|
| 8,279,051 B2 | 10/2012 | Khan |
| 8,289,185 B2 | 10/2012 | Alonso |
| 2006/0178235 A1* | 8/2006 | Coughlan et al. ............ 473/438 |
| 2007/0135243 A1 | 6/2007 | LaRue |
| 2008/0088303 A1* | 4/2008 | Englert .............. A63B 24/0021 324/226 |
| 2008/0089666 A1 | 4/2008 | Aman |
| 2008/0129825 A1 | 6/2008 | DeAngelis |
| 2008/0140233 A1 | 6/2008 | Seacat |
| 2008/0192116 A1 | 8/2008 | Tamir |
| 2009/0111582 A1 | 4/2009 | Schuler |
| 2009/0262137 A1 | 10/2009 | Walker |
| 2010/0030350 A1 | 2/2010 | House |
| 2010/0134614 A1 | 6/2010 | Aman |
| 2010/0184564 A1* | 7/2010 | Molyneux et al. ............... 482/1 |
| 2010/0283630 A1* | 11/2010 | Alonso ................... 340/870.11 |
| 2011/0071792 A1 | 3/2011 | Miner |
| 2011/0194730 A1 | 8/2011 | Rhoads |
| 2011/0304497 A1 | 12/2011 | Molyneux |
| 2012/0015779 A1* | 1/2012 | Powch et al. ..................... 482/9 |
| 2012/0057852 A1 | 3/2012 | Devleeschouwer |
| 2012/0058845 A1 | 3/2012 | Crowley |
| 2012/0271440 A1 | 10/2012 | Lunner |
| 2013/0130843 A1* | 5/2013 | Burroughs et al. .......... 473/415 |

OTHER PUBLICATIONS

Extended European Search Report; EP App. No. 14162990.7; dated Oct. 9, 2014, 9 pages.

"Particle Filtering for Multisensor Data Fusion With Switching Observation Models: Application to Land Vehicle Positioning" Francois Caron, Manuel Davy, Emmanuel Fulos, and Philippe Vaneeghe, Transaction on Signal Processing, vol. 55, No. 6, Jun. 2007, 18 pages.

* cited by examiner

SPORTS MONITORING SYSTEM AND METHOD

CROSS-REFERENCE TO RELATED APPLICATION(S)

This application is related to U.S. patent application Ser. No. 13/471,404 entitled "SYSTEM AND METHOD FOR AUTOMATIC VIDEO FILMING AND BROADCASTING OF SPORTS EVENTS" filed May 14, 2012 and incorporated by reference in its entirety; U.S. patent application Ser. No. 13/660,385 entitled "SPORTS APPARATUS AND METHOD" filed Oct. 25, 2012 and incorporated by reference in its entirety; and U.S. patent application Ser. No. 13/767,756 entitled "SPORTS TRAINING APPARATUS AND METHOD" filed Feb. 14, 2013 and incorporated by reference in its entirety.

FIELD

The present disclosure generally relates to sports monitoring systems, and more specifically, to sports monitoring systems for determining one or more periods of time when one or more projectiles are likely to be spatially closely associated with one or more players. Further, the present disclosure relates to methods of operating the sports monitoring systems. Furthermore, the present disclosure also relates to software products recorded on machine-readable data storage media, wherein the software products are executable upon computing hardware to implement aforesaid methods.

BACKGROUND

In various team sports, it is often desirable to know when one or more players have been in contact with a projectile. For example, in a game of American football, it would be desirable to keep a track of which player has been carrying the projectile (i.e., a football) during playing of the game. Presently, such tracking is often implemented by using cameras, and personnel collating statistics manually.

However, these conventional techniques suffer from a number of disadvantages. Firstly, a viewer watching the game may not be able to identify which player has been carrying the projectile, for example, because of an unclear camera view. Secondly, manual tasks are bound to involve risks of human errors.

U.S. Pat. No. 8,353,791 discloses a method of tracking possession of a sports projectile such as a ball. Based on disclosure a ball has short range radio beacon and each player has receiver for the radio beacon signals and GPS. System can be used to determine which player is in possession of the ball. Problem with said solution is that ball possession could be determined to be on any player in proximity of the ball.

Therefore, there exists a need for a system for determining one or more periods of time when one or more projectiles are likely to be spatially closely associated with one or more players, in an automatic manner.

SUMMARY

The present disclosure seeks to provide a sports monitoring system.

The present disclosure also seeks to provide a method of operating the sports monitoring system.

In one aspect, embodiments of the present disclosure provide a sports monitoring system. The sports monitoring system includes one or more projectiles that are useable in a game to be played by one or more players, one or more sensor units for the players to wear, and a data processing arrangement.

Each projectile is provided therein with an associated motion sensing arrangement that is operable to generate one or more motion-indicative signals, and a data recording arrangement that is operable to record the motion-indicative signals as a function of time.

Optionally, a motion sensing arrangement of a particular projectile may be operable to provide data indicative of acceleration and/or rotation and/or orientation of that particular projectile as a function of time, wherefrom the motion-indicative signals corresponding to that particular projectile may be generated. Accordingly, the motion sensing arrangement of each projectile may include at least one of following sensors: accelerometer, magnetometer, pressure sensor, temperature sensor, gyroscopic sensor, microphone, Global Positioning System (GPS) sensor or other location sensor for indoor and/or outdoor positioning, and timer.

Each sensor unit is provided therein with an associated motion sensing arrangement that is operable to generate one or more motion-indicative signals, and a data recording arrangement that is operable to record the motion-indicative signals as a function of time.

Optionally, a motion sensing arrangement of a particular sensor unit may be operable to provide data indicative of acceleration and/or rotation and/or orientation of a player wearing that particular sensor unit as a function of time, wherefrom the motion-indicative signals corresponding to the player may be generated. Accordingly, the motion sensing arrangement of each sensor unit may include at least one of following sensors: accelerometer, magnetometer, pressure sensor, temperature sensor, gyroscopic sensor, microphone, GPS sensor or other location sensor for indoor and/or outdoor positioning and timer. The term "wear" can include a sensor which is attached in a player for example with band, a sensor embedded or attached in clothes such as shoes, helmet, shirt etc. and a sensor embedded in a sporting equipment carried by the player.

Further, the data processing arrangement is operable to receive data pertaining to the motion-indicative signals from at least one of the projectiles and/or at least one of the sensor units.

Optionally, the at least one of the projectiles may be operable to communicate its recorded data (i.e., data pertaining to the motion-indicative signals corresponding to the projectiles) to the data processing arrangement via a wireless communication link. Similarly, the at least one of the sensor units may be operable to communicate its recorded data (i.e., data pertaining to the motion-indicative signals corresponding to the players) to the data processing arrangement via a wireless communication link.

Furthermore, the data processing arrangement is operable to perform a temporal correlation of the data so received, to determine one or more periods of time when the projectiles are likely to be spatially closely associated with the players.

In accordance with an embodiment of the present disclosure, the temporal correlation is performed to determine when the players have been in contact with the projectiles during playing of the game, and/or when mutual contact between a plurality of players has occurred during playing of the game.

In another aspect, embodiments of the present disclosure provide a method of operating the sports monitoring system.

In yet another aspect, embodiments of the present disclosure provide a software product recorded on machine-readable data storage media, wherein the software product is executable upon computing hardware for implementing the method of operating the sports monitoring system.

Embodiments of the present disclosure substantially eliminate the aforementioned problems in the prior art, and enable users to know when one or more players have been in contact with one or more projectiles during playing of the game, and/or when mutual contact between a plurality of players has occurred during playing of the game, and enable users to collect statistical data indicative of movements and/or spatial positions of the players and/or the projectiles as a function of time, and thereby further analyze the statistical data, for example, to provide feedback on the performance of the players and/or to edit video content recorded by various cameras concurrently during playing of the game.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS OF THE DISCLOSURE

The following detailed description illustrates embodiments of the present disclosure and ways in which it can be implemented. Although the best mode of carrying out the present disclosure has been disclosed, those in the art would recognize that other embodiments for carrying out or practicing the present disclosure are also possible.

Embodiments of the present disclosure provide a sports monitoring system. The sports monitoring system includes one or more projectiles, one or more sensor units for one or more players to wear, and a data processing arrangement. The projectiles are useable in a game to be played by the players.

Each of the projectiles is provided therein with an associated motion sensing arrangement and a data recording arrangement. The motion sensing arrangement is operable to generate one or more motion-indicative signals, while the data recording arrangement is operable to record the motion-indicative signals as a function of time.

The motion sensing arrangement of each of the projectiles may, for example, include at least one of following sensors: accelerometer, magnetometer, pressure sensor, temperature sensor, gyroscopic sensor, microphone, Global Positioning System (GPS) sensor, or other indoor/outdoor location sensors and timer.

Similarly, each of the sensor units is provided therein with an associated motion sensing arrangement and a data recording arrangement. The motion sensing arrangement is operable to generate one or more motion-indicative signals, while the data recording arrangement is operable to record the motion-indicative signals as a function of time.

The motion sensing arrangement of each of the sensor units may, for example, include at least one of following sensors: accelerometer, magnetometer, pressure sensor, temperature sensor, gyroscopic sensor, microphone, GPS sensor or other indoor/outdoor location sensor, and timer.

The data processing arrangement is operable to receive data pertaining to the motion-indicative signals from at least one of the projectiles and/or at least one of the sensor units. The at least one of the projectiles may be operable to communicate its recorded data to the data processing arrangement via a wireless communication link. Further, the at least one of the sensor units may be operable to communicate its recorded data to the data processing arrangement via a wireless communication link.

The data processing arrangement is operable to perform a temporal correlation of the data so received, to determine one or more periods of time when the projectiles are likely to be spatially closely associated with the players. In accordance with an embodiment of the present disclosure, the temporal correlation is performed to determine when the players have been in contact with the projectiles during playing of the game, and/or when mutual contact between a plurality of players has occurred during playing of the game.

Beneficially, at least one of the data processing arrangement and the sensor units may utilize a portable computing device for their implementation within the sports monitoring system.

Figure 1:
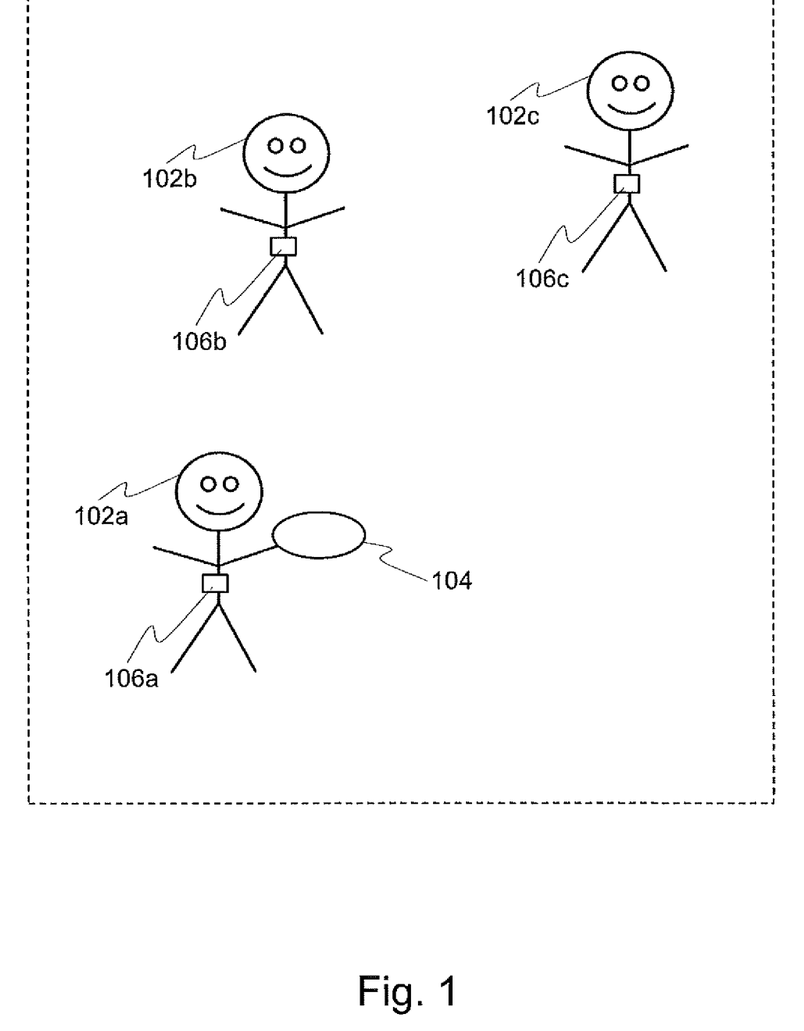
FIG. 1 is a schematic illustration of an example playing scenario in which a sports monitoring system is implemented pursuant to the present disclosure.

Referring now to the drawings, particularly by their reference numbers, FIG. 1 is a schematic illustration of an example playing scenario in which a sports monitoring system is implemented pursuant to the present disclosure. For the sake of simplicity, FIG. 1 shows a portion of a playing area, where one or more players, depicted as a player 102a, a player 102b and a player 102c, are playing a game. The player 102a, the player 102b and the player 102c are hereinafter collectively referred to as players 102.

The sports monitoring system includes one or more projectiles, depicted as a projectile 104 in FIG. 1. The projectile 104 is useable in the game to be played by the players 102.

The projectile 104 is provided therein with an associated motion sensing arrangement and a data recording arrangement (not shown in FIG. 1). The motion sensing arrangement of the projectile 104 is operable to generate one or more motion-indicative signals corresponding to the projectile 104. The data recording arrangement of the projectile 104 is then operable to record the motion-indicative signals as a function of time.

The motion sensing arrangement of the projectile 104 may be operable to provide data indicative of acceleration and/or rotation and/or orientation of the projectile 104 as a function of time, wherefrom the aforementioned motion-indicative signals corresponding to the projectile 104 may be generated. For this purpose, the motion sensing arrangement of the projectile 104 may include at least one of following sensors: accelerometer, magnetometer, pressure sensor, temperature sensor, gyroscopic sensor, microphone, GPS sensor or other indoor/outdoor location sensor, and timer.

The motion-indicative signals corresponding to the projectile 104 may include information about at least one of: an identification code (ID) associated with the projectile 104, one or more movements (for example, accelerations and/or rotations and/or orientations) of the projectile 104, one or more spatial positions of the projectile 104, sound received by microphone, and associated time stamps. In addition to time stamps the received (and recorded) audio can be used for time stamping purposes. In addition recorded sound can be used to determine if a projectile is in motion i.e. used as motion-indicative signal.

The sports monitoring system also includes one or more sensor units for the players 102 to carry, for example, by wearing the sensor units during playing of the game. With reference to FIG. 1, the player 102a is wearing a sensor unit 106a, the player 102b is wearing a sensor unit 106b, and the player 102c is wearing a sensor unit 106c. The sensor unit 106a, the sensor unit 106b and the sensor unit 106c are hereinafter referred to as the sensor units 106. The players 102 may, for example, wear the sensor units 106 by a detachable attachment to waist, wrist, ankle, or any other suitable part of body or in the sporting equipment carried by the players 102. In some embodiments the sensor unit 106 is attached to player 102 in a way that it is possible to determine orientation of the player 102 in respect to playing field. In some embodiments player 102 might have more than one sensor 106.

For example, the sports monitoring system may be implemented for use in a game of ice hockey, wherein the playing area may be an ice hockey rink, and the projectile 104 may be a hockey puck. Accordingly, the player 102a may be carrying and/or wearing one or more sports equipments, such as a hockey stick, hockey skates, a hockey helmet, protective gloves and various protective pads, during playing of the game. Beneficially, the sensor unit 106a may be implemented spatially within at least one of the sports equipments carried and/or worn by the player 102a.

Each of the sensor units 106 is provided therein with an associated motion sensing arrangement and a data recording arrangement (not shown in FIG. 1). The motion sensing arrangement of the sensor unit 106a is operable to generate one or more motion-indicative signals corresponding to the player 102a wearing the sensor unit 106a. Similarly, the motion sensing arrangements of the sensor unit 106b and the sensor unit 106c are operable to generate one or more motion-indicative signals corresponding to the player 102b and the player 102c wearing the sensor unit 106b and the sensor unit 106c, respectively.

The data recording arrangement of each of the sensor units 106 is then operable to record the corresponding motion-indicative signals as a function of time.

The motion sensing arrangements of the sensor units 106 may be operable to provide data indicative of acceleration and/or rotation and/or orientation of the players 102 as a function of time, wherefrom the aforementioned motion-indicative signals corresponding to the players 102 may be generated. For this purpose, the motion sensing arrangement of each of the sensor units 106 may include at least one of following sensors: accelerometer, magnetometer, pressure sensor, temperature sensor, gyroscopic sensor, microphone, GPS sensor or other indoor/outdoor location sensor, and timer.

For example, the motion-indicative signals corresponding to the player 102a may include information about at least one of: an ID associated with the player 102a, one or more movements (for example, accelerations and/or rotations and/or orientations) of the player 102a, one or more spatial positions of the player 102a, sound received by microphone in a sensor and associated time stamps. In addition to time stamps the received (and recorded) audio can be used for time stamping purposes. In addition recorded sound can be used to determine if a player is in motion i.e. used as motion-indicative signal.

Further, the sports monitoring system includes a data processing arrangement (not shown in FIG. 1) that is operable to receive data pertaining to the motion-indicative signals from the projectile 104 and/or at least one of the sensor units 106. The projectile 104 may be operable to communicate its recorded data (i.e., data pertaining to the motion-indicative signals corresponding to the projectile 104) to the data processing arrangement via a wireless communication link. Further, the at least one of the sensor units 106 may be operable to communicate its recorded data (i.e., data pertaining to the motion-indicative signals corresponding to the players 102) to the data processing arrangement via a wireless communication link.

The data processing arrangement is operable to perform a temporal correlation of the data so received, to determine one or more periods of time when the projectile 104 is likely to be spatially closely associated with the players 102. In accordance with an embodiment of the present disclosure, the temporal correlation is performed to determine when the players 102 have been in contact with the projectile 104 during playing of the game, and/or when mutual contact between a plurality of players from amongst the players 102 has occurred during playing of the game.

Embodiments of the present disclosure are suitable for sports such as American football, football, soccer, hockey, ice hockey, and basketball, but not limited thereto. In the example playing scenario, the sports monitoring system has been implemented for use in a game of American football, wherein the playing area corresponds to a football field, and the projectile 104 corresponds to a football. In some sports the number of projectiles in a game 104 might be more than one.

During playing of the game of American football, the player 102a holds the projectile 104 for a particular period of time, as shown in FIG. 1. The temporal correlation between the data pertaining to the player 102a and the projectile 104 enables the data processing arrangement to determine the particular period of time when the player 102a has been in contact with the projectile 104 during playing of the game. Details of how the temporal correlation is performed have been provided in conjunction with FIGS. 5 and 6.

It should be noted here that the implementation of the sports monitoring system is not limited to a specific number of projectiles and players. FIG. 1 is merely an example, which should not unduly limit the scope of the claims herein. One of ordinary skill in the art would recognize many variations, alternatives, and modifications of embodiments herein.

Figure 2:
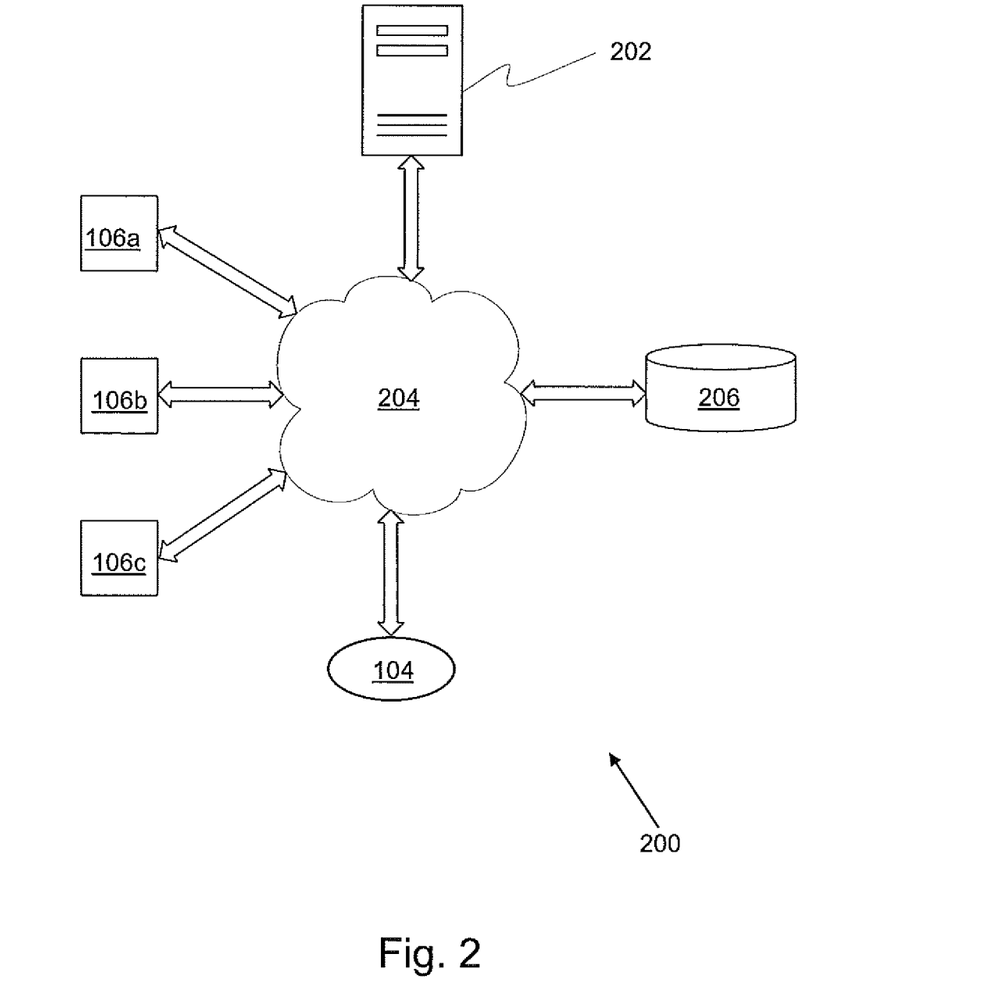
FIG. 2 is a schematic illustration of the sports monitoring system, in accordance with an embodiment of the present disclosure.

FIG. 2 is a schematic illustration of a sports monitoring system 200, in accordance with an embodiment of the present disclosure. The sports monitoring system 200 includes the projectile 104, the sensor units 106 and a data processing arrangement 202.

A wireless communication network 204 couples the projectile 104, the sensor units 106 and the data processing arrangement 202 in communication with each other. The wireless communication network 204 can be a collection of individual networks, interconnected with each other and functioning as a single large network. Typical examples of such individual networks include, although are not limited to, Wireless Local Area Networks (WLAN) and Wireless Personal-Area Networks (WPAN).

In accordance with an embodiment of the present disclosure, the projectile 104 is operable to communicate its recorded data (i.e., data pertaining to the motion-indicative signals corresponding to the projectile 104) to the data processing arrangement 202 via a wireless communication link.

In accordance with an embodiment of the present disclosure, the sensor units 106 are operable to communicate their recorded data (i.e., data pertaining to the motion-indicative signals corresponding to the players 102) to the data processing arrangement 202 via wireless communication links.

In accordance with another embodiment of the present disclosure, the projectile 104 and/or the sensor units 106 are operable to create a virtual sensor network by sharing their recorded data amongst themselves. In such a case, at least one of the sensor units 106 and/or the projectile 104 is required to communicate the recorded data to the data processing arrangement 202.

In accordance with yet another embodiment of the present disclosure, at least one of the sensor units 106 and/or the projectile 104 is operable to collect the recorded data from the sensor units 106 and/or the projectile 104, and communicate the data so collected to the data processing arrangement 202.

The data processing arrangement 202 is operable to receive data pertaining to the motion-indicative signals corresponding to the projectile 104 and the players 102, and perform a temporal correlation of the data so received, to determine one or more periods of time when the projectile 104 is likely to be spatially closely associated with the players 102.

In accordance with an embodiment of the present disclosure, the temporal correlation is performed to determine at least one of:

(a) one or more periods of time when the players 102 have been in contact with the projectile 104 during playing of the game, and/or (b) one or more periods of time when mutual contact between a plurality of players from amongst the players 102 has occurred during playing of the game.

The data processing arrangement 202 may perform the temporal correlation either periodically or concurrently during playing of the game. Alternatively, the data processing arrangement 202 may perform the temporal correlation after the game is over.

For example, the data processing arrangement 202 may perform the temporal correlation concurrently during playing of the game, to collect statistical data indicative of movements and/or spatial positions of the players 102 and/or the projectile 104 as a function of time. Optionally, the data processing arrangement 202 may be coupled in communication with one or more cameras (not shown in FIG. 2) installed in the playing area. Accordingly, the data processing arrangement 202 may be operable to analyze the statistical data for editing video content recorded by the cameras. In this way, the video content may be edited concurrently during playing of the game.

Optionally, the data processing arrangement 202 may be coupled in communication with a remote server (not shown in FIG. 2) that may be operable to collect statistical data indicative of movements and/or spatial positions of the players 102 and/or the projectile 104 as a function of time. The remote server may, for example, be operable to further analyze the statistical data to provide feedback on the performance of the players 102.

For this purpose, the sports monitoring system 200 may include one or more databases, depicted as a database 206 in FIG. 2. The data processing arrangement 202 may be coupled in communication with the database 206, whereat the data processing arrangement 202 may store data pertaining to the periods of time when the players 102 have been in contact with the projectile 104 and/or when mutual contact between the plurality of players from amongst the players 102 has occurred during playing of the game.

Beneficially, the data processing arrangement 202 may be implemented using a wireless device/a portable computing device that includes computing hardware which is operable to execute one or more software products recorded on machine-readable data storage media. In one embodiment, the computing hardware comprises a controller, microcontroller or processor device, as is generally described herein. Optionally, the wireless device may be spatially positioned in a proximity of the playing area. Typical examples of such a wireless device/a portable computing device include, although are not limited to, a smart telephone, a Mobile Internet Device (MID), a tablet computer, an Ultra-Mobile Personal Computer (UMPC), a phablet, a Personal Digital Assistant (PDA), a web pad, a Personal Computer (PC), a Handheld PC, a laptop computer, and a server.

In accordance with an embodiment of the present disclosure, at least one of the data processing arrangement 202 and the sensor units 106 utilizes a smart telephone for its implementation within the sports monitoring system 200.

It should be noted here that the sports monitoring system 200 is not limited to a specific number of projectiles, sensor units, data processing arrangements and databases. FIG. 2 is merely an example, which should not unduly limit the scope of the claims herein. One of ordinary skill in the art would recognize many variations, alternatives, and modifications of embodiments herein.

Figure 3:
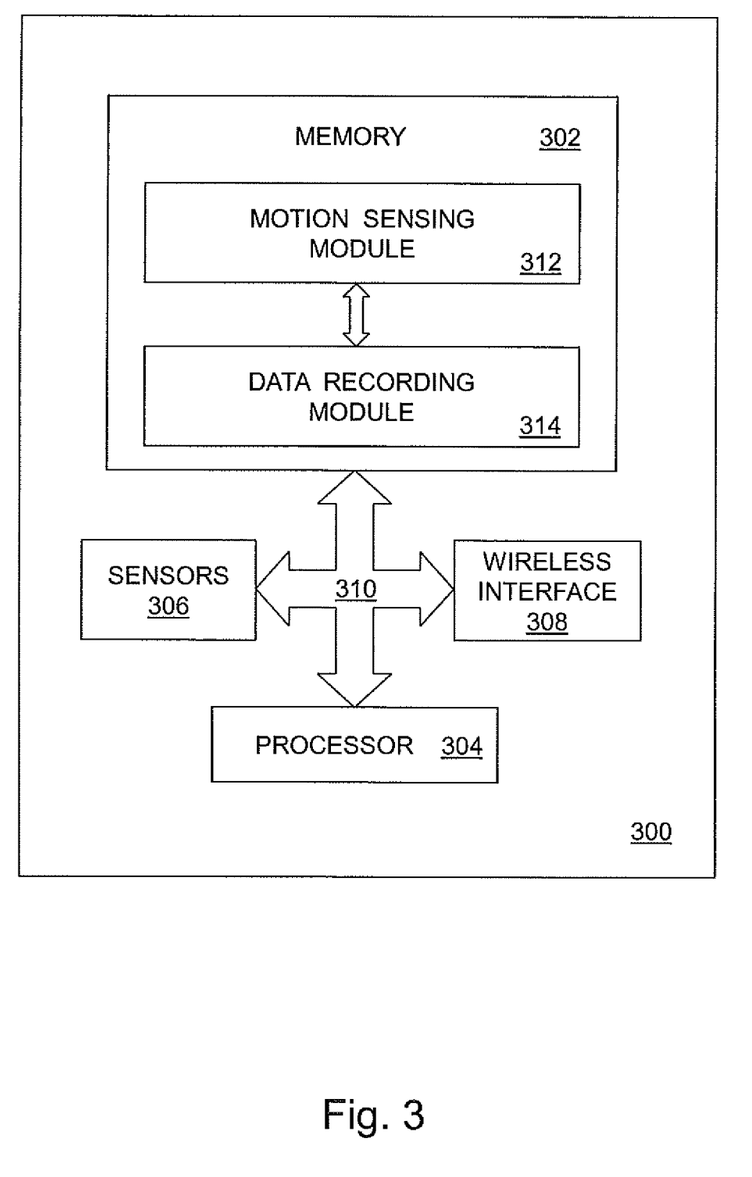
FIG. 3 is a schematic illustration of various components in an example implementation of a sensor unit, in accordance with an embodiment of the present disclosure.

FIG. 3 is a schematic illustration of various components in an example implementation of a sensor unit 300, in accordance with an embodiment of the present disclosure. The sensor unit 300 could be implemented either as the sensor units 106 or spatially within the projectile 104. For illustration purposes only, let us consider that the sensor unit 300 is implemented spatially within the projectile 104.

The sensor unit 300 includes, but is not limited to, a memory 302, a processor 304, a configuration of sensors 306, a wireless interface 308, and a system bus 310 that operatively couples various components including memory 302, processor 304, the sensors 306 and the wireless interface 308. Memory 302 stores a motion sensing module 312 and a data recording module 314.

The sensors 306 may include at least one of: accelerometer, magnetometer, pressure sensor, temperature sensor, gyroscopic sensor, microphone, GPS sensor or other indoor/outdoor location sensor, and timer. Outputs generated by the sensors 306 may, for example, be indicative of accelerations and/or rotations and/or orientations of the projectile 104 as a function of time.

Beneficially, the motion sensing module 312 may be interfaced with the sensors 306. When executed on processor 304, the motion sensing module 312 is operable to resolve and integrate the outputs generated by the sensors 306 into the aforementioned motion-indicative signals corresponding to the projectile 104.

As described earlier, the motion-indicative signals may include information about at least one of: an ID pertaining to the sensor unit 300, one or more movements (for example, accelerations and/or rotations and/or orientations) of the projectile 104, one or more spatial positions of the projectile 104, and associated time stamps. The ID may, for example, be a Media Access Control (MAC) address, a Terminal Identifier (TID), or other identification pertaining to the sensor unit 300.

Optionally, the sensors 306 may include a GPS sensor for determining one or more absolute spatial positions of the projectile 104 upon a surface of the Earth. Alternatively, the wireless communication network 204 may be employed to determine one or more relative spatial positions of the projectile 104, for example, by way of triangulation. For this purpose, the wireless communication network 204 may, for example, include wireless routers for Wi-Fi communication, or Bluetooth base stations ("Bluetooth" is a registered trademark).

Optionally, the sensors 306 may include a timer for including the time stamps in the motion-indicative signals. Alternatively, processor 304 may provide system time as reference for including the time stamps in the motion-indicative signals.

When executed on processor 304, the data recording module 314 is operable to record the motion-indicative signals as a function of time. Optionally, the sensor unit 300 may include one or more data storage media (not shown in FIG. 3) for storing the recorded data as a function of time.

Alternatively, the sensor unit 300 may be coupled in communication with the database 206, whereat the data recording module 314 may store the recorded data either periodically or on real-time basis.

In accordance with an embodiment of the present disclosure, the sensor unit 300 is operable to communicate its recorded data to the data processing arrangement 202 using the wireless interface 308.

In accordance with another embodiment of the present disclosure, the sensor unit 300 and the sensor units 106 are operable to create a virtual sensor network by sharing their recorded data amongst themselves. In such a case, at least one of the sensor units 106 and/or the sensor unit 300 is required to communicate the recorded data (i.e., data pertaining to the motion-indicative signals corresponding to the players 102 and the projectile 104) to the data processing arrangement 202.

In accordance with yet another embodiment of the present disclosure, the sensor unit 300 is operable to collect the recorded data from the sensor units 106, and communicate the data so collected to the data processing arrangement 202 using the wireless interface 308.

Optionally, the wireless interface 308 may be used to upload new configuration and/or software updates to the sensor unit 300.

The sensor unit 300 may also include a power source (not shown in FIG. 3) for supplying electrical power to various components of the sensor unit 300. The power source may, for example, be a battery or other suitable power storage means.

FIG. 3 is merely an example, which should not unduly limit the scope of the claims herein. It is to be understood that the specific designation for the sensor unit 300 is for the convenience of reader and is not to be construed as limiting the sensor unit 300 to specific numbers, types, or arrangements of modules and/or components of the sensor unit 300. One of ordinary skill in the art would recognize many variations, alternatives, and modifications of embodiments of the present disclosure.

For example, the sensor units 106 could be implemented in a manner similar to the example implementation of the sensor unit 300. With reference to FIG. 3, the sensor unit 300 has been implemented spatially within the projectile 104 for illustration purposes only.

Further, the sensors 306 and the motion sensing module 312 form a part of the aforementioned motion sensing arrangement of the projectile 104, while the data recording module 314 forms a part of the aforementioned data recording arrangement of the projectile 104.

Figure 4:
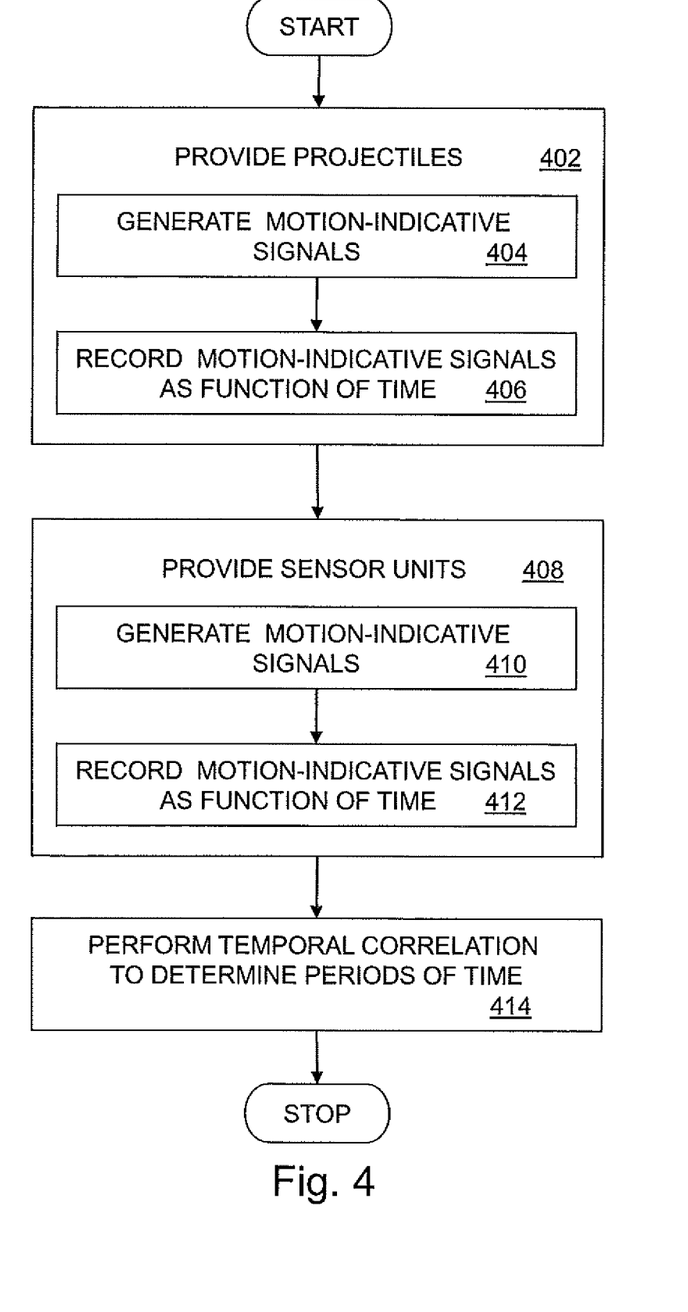
FIG. 4 is an illustration of steps of a method of operating the sports monitoring system, in accordance with an embodiment of the present disclosure.

FIG. 4 is an illustration of a method of operating the sports monitoring system 200, in accordance with an embodiment of the present disclosure. The method is depicted as a collection of steps in a logical flow diagram, which represents a sequence of steps that can be implemented in hardware, software, or a combination thereof.

At a step 402, the sports monitoring system 200 is provided with one or more projectiles, such as the projectile 104. In accordance with the step 402, the projectile 104 is provided therein with the associated motion sensing arrangement and the data recording arrangement, as described earlier.

The step 402 includes a sub-step of arranging for the motion sensing arrangement of the projectile 104 to include at least one of following sensors: accelerometer, magnetometer, pressure sensor, temperature sensor, gyroscopic sensor, microphone, GPS sensor or other indoor/outdoor location sensor, and timer.

In addition, the step 402 includes a step 404 and a step 406. At the step 404, the motion sensing arrangement of the projectile 104 operates to generate the motion-indicative signals corresponding to the projectile 104. Subsequently, at the step 406, the data recording arrangement of the projectile 104 operates to record the motion-indicative signals generated at the step 404. In accordance with the step 406, the motion-indicative signals are recorded as a function of time.

Further, at a step 408, the sports monitoring system 200 is provided with one or more sensor units, such as the sensor units 106 that are wearable by the players 102. In accordance with the step 408, each of the sensor units 106 is provided therein with the associated motion sensing arrangement and the data recording arrangement, as described earlier.

The step 408 includes a sub-step of arranging for the motion sensing arrangement of each of the sensor units 106 to include at least one of following sensors: accelerometer, magnetometer, pressure sensor, temperature sensor, gyroscopic sensor, microphone, GPS sensor or other indoor/outdoor location sensor, and timer.

In addition, the step 408 includes a step 410 and a step 412. At the step 410, the motion sensing arrangements of the sensor units 106 operate to generate the motion-indicative signals corresponding to the players 102. Subsequently, at the step 412, the data recording arrangements of the sensor units 106 operate to record the corresponding motion-indicative signals generated at the step 410. In accordance with the step 412, the motion-indicative signals are recorded as a function of time.

Beneficially, the method includes an additional step in which at least one of the sensor units 106 and/or the projectile 104 operates to communicate its recorded data (i.e., data pertaining to the motion-indicative signals corresponding to the players 102 and/or the projectile 104) to the data processing arrangement 202 via a wireless communication link, as described earlier.

Optionally, the projectile 104 and/or the sensor units 106 may perform one or more additional steps of sharing their recorded data amongst themselves to create a virtual sensor network. Alternatively, at least one of the sensor units 106 and/or the projectile 104 may perform an additional step of collecting the recorded data from the sensor units 106 and/or the projectile 104.

Finally, at a step 414, the data processing arrangement 202 operates to receive data pertaining to the motion-indicative signals from the projectile 104 and/or at least one of the sensor units 106, and perform a temporal correlation of the data so received. Based on the temporal correlation performed at the step 414, the data processing arrangement 202 operates to determine one or more periods of time when the projectile 104 is likely to be spatially closely associated with the players 102.

In accordance with an embodiment of the present disclosure, the step 414 is performed to determine at least one of:

(a) one or more periods of time when the players 102 have been in contact with the projectile 104 during playing of the game, and/or (b) one or more periods of time when mutual contact between a plurality of players from amongst the players 102 has occurred during playing of the game.

The step 414 may be performed either periodically or concurrently during playing of the game. Alternatively, the step 414 may be performed after the game is over.

Optionally, the method may also include an additional step of arranging for at least one of the data processing arrangement 202 and the sensor units 106 to utilize a smart telephone for their implementation within the sports monitoring system 200.

It should be noted here that the steps 402 to 414 are only illustrative and other alternatives can also be provided where one or more steps are added, one or more steps are removed, or one or more steps are provided in a different sequence without departing from the scope of the claims herein. For example, the step 402 may be performed simultaneously with the step 408. The steps 404 and 406 may be performed simultaneously with the steps 410 and 412, for example, during playing of the game.

Optionally, the method may include an additional step of collecting statistical data indicative of movements and/or spatial positions of players 102 and/or the projectile 104 as a function of time.

Optionally, the method may include an additional step of analyzing the statistical data for at least one of:

(a) editing video content recorded by the cameras, and/or (b) providing feedback on the performance of the players 102.

Such an analysis may, for example, be performed either concurrently during playing of the game or after the game is over. Additionally consumers accessing the system could be provided performance related statistics from the venue and/or other content and information related to the game. Consumers could for example download video clips related to the game in their mobile terminal or a computer at home.

These additional steps may, for example, be performed either by the data processing arrangement 202, or by a remote server coupled in communication with the data processing arrangement 202.

Figure 5:
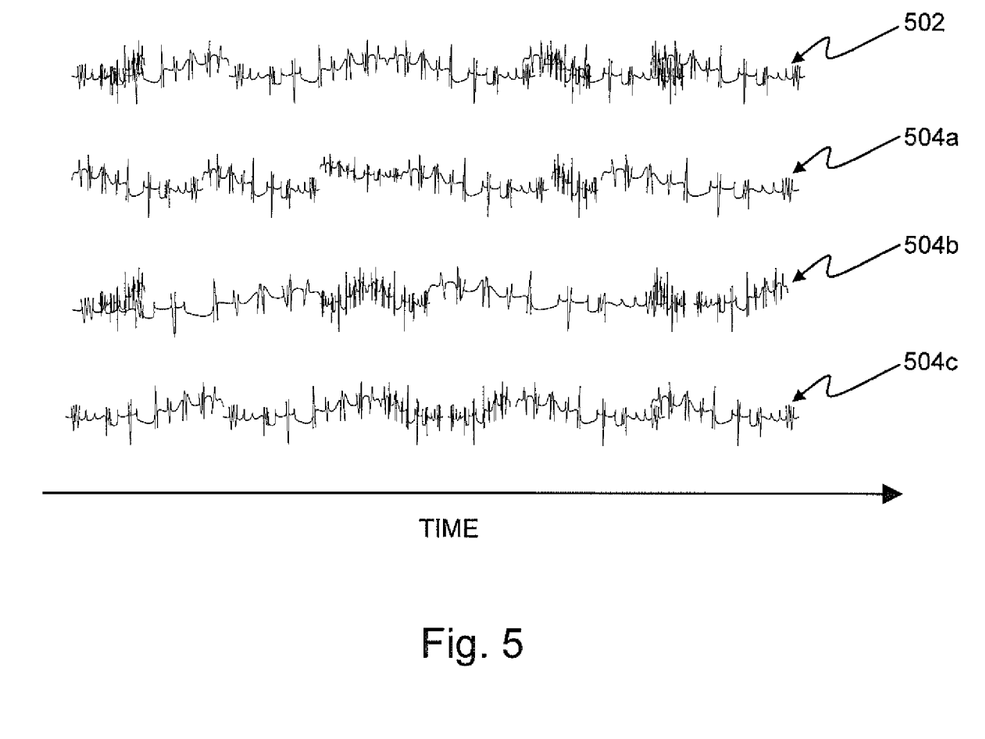
FIG. 5 is an illustration of an example set of motion-indicative signals as functions of time, in accordance with an embodiment of the present disclosure.

FIG. 5 is an illustration of an example set of motion-indicative signals as functions of time, in accordance with an embodiment of the present disclosure. The example set of motion-indicative signals includes a motion-indicative signal 502 corresponding to the projectile 104, a motion-indicative signal 504a corresponding to the player 102a, a motion-indicative signal 504b corresponding to the player 102b, and a motion-indicative signal 504c corresponding to the player 102c. The motion-indicative signals 502, 504a, 504b and 504c have been depicted as functions of time, in FIG. 5.

The data processing arrangement 202 performs a temporal correlation between the motion-indicative signals 502, 504a, 504b and 504c, to determine at least one of:

(a) one or more periods of time when the players 102 have been in contact with the projectile 104 during playing of the game, and/or (b) one or more periods of time when mutual contact between a plurality of players from amongst the players 102 has occurred during playing of the game.

For example, in order to determine the periods of time when the players 102 have been in contact with the projectile 104, the data processing arrangement 202 may perform the temporal correlation between the motion-indicative signals 502 and 504a, between the motion-indicative signals 502 and 504b, and between the motion-indicative signals 502 and 504c.

The temporal correlation may, for example, be performed by way of sliding dot product. A sliding dot product may, for example, be calculated by sliding the motion-indicative signal 502 over the motion-indicative signal 504a. The value of the sliding dot product is considerably large during periods of time when the motion-indicative signals 502 and 504a substantially match with each other, i.e., when the projectile 104 is likely to be spatially closely associated with the player 102a.

Optionally, the temporal correlation between the motion-indicative signals 502 and 504a may be performed for a suitable period of time, for example, from a starting point of the motion-indicative signals 502 and 504a. Subsequently, the temporal correlation may be iteratively performed for other suitable periods of time. Accordingly, the temporal correlation may also indicate how dependence between the motion-indicative signals 502 and 504a varies with respect to time.

Further, the data processing arrangement 202 may perform a temporal correlation between the motion-indicative signals 504a, 504b and 504c, to determine the periods of time when mutual contact between a plurality of players from amongst the players 102 has occurred.

Figure 6:
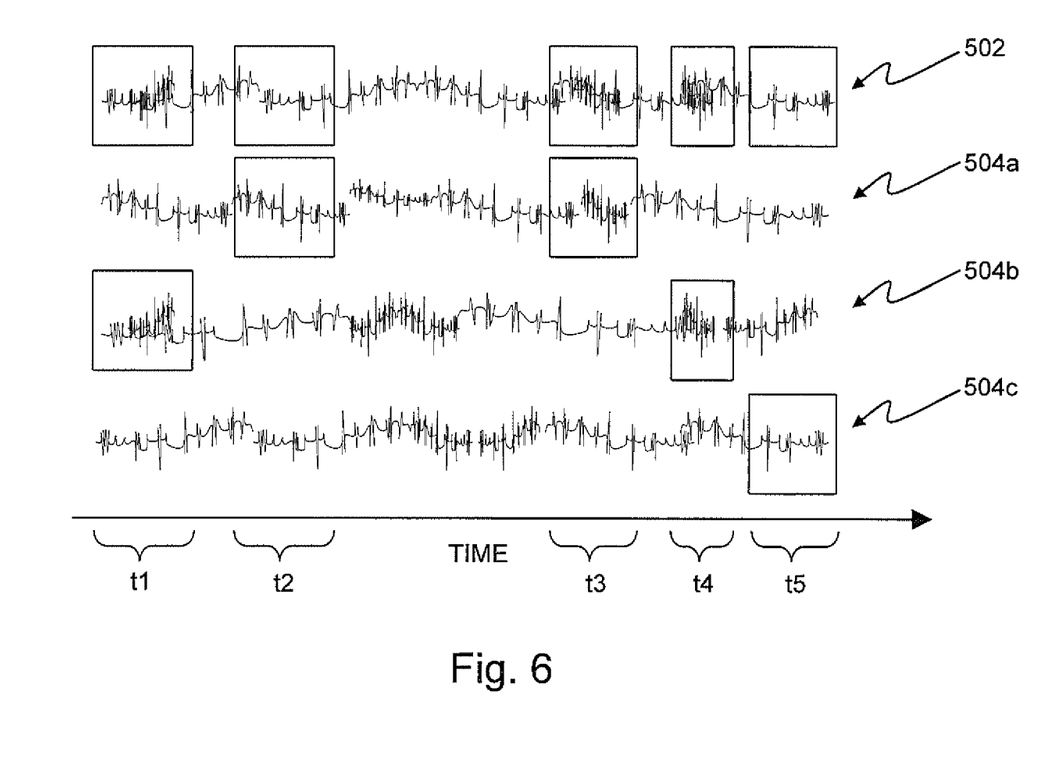
FIG. 6 is an illustration of results of a temporal correlation performed on the example set of motion-indicative signals, in accordance with an embodiment of the present disclosure.

FIG. 6 is an illustration of results of the temporal correlation performed on the example set of motion-indicative signals, in accordance with an embodiment of the present disclosure. With reference to FIG. 6, the results of the temporal correlation performed on the motion-indicative signals 502, 504a, 504b and 504c are indicative of the following:

(a) the projectile 104 is likely to be spatially closely associated with the player 102a during a period of time (t2) and a period of time (t3), (b) the projectile 104 is likely to be spatially closely associated with the player 102b during a period of time (t1) and a period of time (t4), and (c) the projectile 104 is likely to be spatially closely associated with the player 102c during a period of time (t5).

Based on the results of the temporal correlation, statistical data on when the players 102 have been in contact with the projectile 104 may be derived.

Further, results of the temporal correlation performed on the motion-indicative signals 504a, 504b and 504c may be indicative of the periods of time when mutual contact between a plurality of players from amongst the players 102 has occurred. The results may, for example, be indicative of one or more periods of time when a plurality of players moved in sync with each other. For example, a plurality of players involved in a tackle situation may be moving with apparently large accelerations and/or in the same direction at the same time.

Embodiments of the present disclosure can be used for various purposes, including, though not limited to, enabling users to know when one or more players have been in contact with one or more projectiles during playing of the game, and/or when mutual contact between a plurality of players has occurred during playing of the game, and enabling users to collect statistical data indicative of movements and/or spatial positions of the players and/or the projectiles as a function of time, and thereby further analyze the statistical data, for example, to provide feedback on the performance of the players and/or to edit video content recorded by various cameras concurrently during playing of the game.

The aspects of the disclosed embodiments may also include software and computer programs incorporating the process steps and instructions described above that are executed in one or more computers. In one embodiment, one or more computing devices, such as the data processing arrangement 202 and sensor units 106 of FIG. 2 or sensor unit 300 of FIG. 3, for example, are generally adapted to utilize program storage devices embodying machine readable program source code, which is adapted to cause the computing devices to perform the method steps of the present disclosure. The program storage devices incorporating features of the present disclosure may be devised, made and used as a component of a machine utilizing optics, magnetic properties and/or electronics to perform the procedures and methods of the present disclosure. In alternate embodiments, the program storage devices may include magnetic media such as a diskette or computer hard drive, which is readable and executable by a computer. In other alternate embodiments, the program storage devices could include optical disks, read-only-memory ("ROM") floppy disks and semiconductor materials and chips.

The computing devices generally described herein may also include one or more processors or microprocessors for executing stored programs. The computing device may include a data storage device for the storage of information and data. The computer program or software incorporating the processes and method steps incorporating features of the present disclosure may be stored in one or more computers on an otherwise conventional program storage device.

Modifications to embodiments of the present disclosure described in the foregoing are possible without departing from the scope of the present disclosure as defined by the accompanying claims. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A sports monitoring system, wherein the system includes:
one or more projectiles having an associated motion sensing arrangement for generating one or more motion-indicative signals, and a data recording arrangement for recording the one or more motion-indicative signals as a function of time;
sensor units for a plurality of players to wear, each having a motion sensing arrangement for generating one or more motion-indicative signals, each motion sensing arrangement including a microphone and the one or more motion-indicative signals including sound recorded by the microphone, and a data recording arrangement for recording the one or more motion-indicative signals as a function of time; and
a data processing arrangement for receiving data pertaining to the motion-indicative signals from at least one of the one or more projectiles and the plurality of sensor units, for performing a temporal correlation of the data pertaining to the motion indicative signals including the sound recorded by the microphone, by using a sliding dot product to identify a substantial match among the data from at least one of the one or more projectiles and the data from the plurality of sensor units, and for using the substantial match among the data to determine one or more periods of time when actual mutual contact among the plurality of players has occurred, the motion indicative signals of the at least one projectile and the at least one player sensing unit further comprising acceleration, rotation, or orientation information.

2. The sports monitoring system as claimed in claim 1, wherein the temporal correlation is performed for determining when the one or more players have been in contact with the one or more projectiles during playing of the game.

3. The sports monitoring system as claimed in claim 1, wherein the at least one of the one or more projectiles is operable to communicate its recorded data to the data processing arrangement via a wireless communication link.

4. The sports monitoring system as claimed in claim 1, wherein the at least one of the one or more sensor units is operable to communicate its recorded data to the data processing arrangement via a wireless communication link.

5. The sports monitoring system as claimed in claim 1, wherein the motion sensing arrangement of each of the one or more projectiles includes at least one of following sensors: accelerometer, magnetometer, pressure sensor, temperature sensor, gyroscopic sensor, microphone, Global Positioning System (GPS) sensor or other indoor/outdoor sensor, and timer.

6. The sports monitoring system as claimed in claim 1, wherein the motion sensing arrangement of each of the one or more sensor units includes at least one of following sensors: accelerometer, magnetometer, pressure sensor, temperature sensor, gyroscopic sensor, Global Positioning System (GPS) sensor or other indoor/outdoor sensor, and timer.

7. The sports monitoring system as claimed in claim 1, wherein at least one of the data processing arrangement and the sensor units utilize a portable computing device for their implementation within the system.

8. A method of operating a sports monitoring system, wherein the method includes:
 providing the system with one or more projectiles having an associated motion sensing arrangement for generating one or more motion-indicative signals and a data recording arrangement for recording the one or more motion-indicative signals as a function of time;
 providing the system with one or more sensor units for a plurality of players to wear, each sensor unit having a motion sensing arrangement for generating one or more motion-indicative signals, each motion sensing arrangement including a microphone and the one or more motion-indicative signals including sound recorded by the microphone, and a data recording arrangement for recording the one or more motion-indicative signals as a function of time; and
 providing the system with a data processing arrangement for receiving data pertaining to the motion-indicative signals from at least one of the one or more projectiles and the plurality of sensor units, and for performing a temporal correlation of the data pertaining to the motion indicative signals including the sound recorded by the microphone, by using a sliding dot product to identify a substantial match among the data from at least one of the one or more projectiles and the data from the plurality of sensor units, and for using the substantial match among the data to determine one or more periods of time when actual mutual contact among the plurality of players has occurred, the motion indicative signals of the at least one projectile and the at least one player sensing unit further comprising acceleration, rotation, or orientation information.

9. The method as claimed in claim 8, wherein the method includes performing the temporal correlation for determining when the one or more players have been in contact with the one or more projectiles during playing of the game.

10. The method as claimed in claim 8, wherein the method includes operating the at least one of the one or more projectiles to communicate its recorded data to the data processing arrangement via a wireless communication link.

11. The method as claimed in claim 8, wherein the method includes operating the at least one of the one or more sensor units to communicate its recorded data to the data processing arrangement via a wireless communication link.

12. The method as claimed in claim 8, wherein the method includes arranging for the motion sensing arrangement of each of the one or more projectiles to include at least one of following sensors: accelerometer, magnetometer, pressure sensor, temperature sensor, gyroscopic sensor, microphone, Global Positioning System (GPS) sensor or indoor/outdoor location sensor, and timer.

13. The method as claimed in claim 8, wherein the method includes arranging for the motion sensing arrangement of each of the one or more sensor units to include at least one of following sensors: accelerometer, magnetometer, pressure sensor, temperature sensor, gyroscopic sensor, Global Positioning System (GPS) sensor or other indoor/outdoor location sensor, and timer.

14. The method as claimed in claim 8, wherein the method includes arranging for at least one of the data processing arrangement and the sensor units to utilize a portable computing device for their implementation within the system.

15. A software product recorded on machine-readable data storage media, wherein the software product is executable upon computing hardware for implementing the method as claimed in claim 8.

* * * * *